United States Patent
Rabinovich et al.

(10) Patent No.: US 12,040,886 B2
(45) Date of Patent: Jul. 16, 2024

(54) SYSTEM AND METHOD OF CLOCK RECOVERY IN A PACKET-COMPATIBLE NETWORK

(71) Applicant: ADTRAN Networks SE, Meiningen (DE)

(72) Inventors: Michael Rabinovich, Modiin (IL); Moshe Tofef, Netanya (IL)

(73) Assignee: ADTRAN Networks SE, Meiningen (DE)

( * ) Notice: Subject to any disclaimer, the term of this patent is extended or adjusted under 35 U.S.C. 154(b) by 63 days.

(21) Appl. No.: 17/941,637

(22) Filed: Sep. 9, 2022

(65) Prior Publication Data

US 2023/0076889 A1    Mar. 9, 2023

(30) Foreign Application Priority Data

Sep. 9, 2021    (EP) .................................... 21195799

(51) Int. Cl.
*H04J 3/06* (2006.01)
*H04L 47/283* (2022.01)

(52) U.S. Cl.
CPC .......... *H04J 3/0667* (2013.01); *H04J 3/0641* (2013.01); *H04J 3/0682* (2013.01)

(58) Field of Classification Search
CPC ...... H04J 3/0641; H04J 3/0658; H04J 3/0667; H04J 3/0682; H04J 3/14; H04L 47/245; H04L 47/283

See application file for complete search history.

(56) References Cited

U.S. PATENT DOCUMENTS

| | | | | |
|---|---|---|---|---|
| 9,021,291 B2 * | 4/2015 | Magee | .................... | H03L 7/099 |
| | | | | 713/400 |
| 9,219,562 B2 * | 12/2015 | Chen | ..................... | H04J 3/0679 |
| 9,288,002 B2 * | 3/2016 | Sergeev | ................ | H04J 3/0667 |
| 9,306,692 B2 * | 4/2016 | Rabinovich | ........... | H04J 3/0658 |
| 9,596,072 B2 * | 3/2017 | Turnbull | ............... | H04J 3/0664 |
| 9,742,514 B2 * | 8/2017 | Zhao | ..................... | H04J 3/0697 |

(Continued)

OTHER PUBLICATIONS

S. Bjornstad et al, "Minimizing delay and packet delay variation in switched 5G transport networks," in Journal of Optical Communications and Networking, vol. 11, No. 4, Apr. 2019, pp. B49-B59.

(Continued)

*Primary Examiner* — Alpus Hsu
(74) *Attorney, Agent, or Firm* — Whitestone Law, PLLC

(57) ABSTRACT

There is provided a method of clock recovery and a system thereof. The method comprises: by master clock node or by client clock node, generating a first flow of time-stamped packets bearing indication of high priority of delivery and, in parallel, generating a second flow of time-stamped packets bearing indication of lower priority of delivery. By client clock node, processing the packets from the first flow separately from the packets from the second flow to define, separately for each flow, a function informative of changes of packets' delays in the respective flow over time; using the defined functions informative of changes of packets' delays in the first and the second flows over the same time intervals to assess a cause of the packets' delays changes; and applying a clock recovery algorithm in a manner differentiated in accordance with the assessed cause.

18 Claims, 8 Drawing Sheets

(56) References Cited

U.S. PATENT DOCUMENTS

| | | |
|---|---|---|
| 9,942,027 B2 * | 4/2018 | Regev .................. H04J 3/0682 |
| 2009/0276542 A1 | 11/2009 | Aweya et al. |
| 2010/0020829 A1 * | 1/2010 | Ruffini ................. H04J 3/0632 370/509 |
| 2011/0134766 A1 | 6/2011 | Zampetti et al. |
| 2012/0269204 A1 | 10/2012 | Zampetti |
| 2013/0208735 A1 | 8/2013 | Mizrahi et al. |
| 2015/0163154 A1 | 6/2015 | Van Chaloupka et al. |
| 2018/0013508 A1 * | 1/2018 | Rabinovich ........... H04J 3/0667 |
| 2018/0145863 A1 | 5/2018 | Van Chaloupka et al. |
| 2018/0287725 A1 * | 10/2018 | Rabinovich ........... H04J 3/0673 |
| 2019/0076951 A1 | 3/2019 | Ihde |

OTHER PUBLICATIONS

Extended European Search Report, European Patent Application No. 21195799.8, mailed Mar. 3, 2022.

* cited by examiner

SYSTEM AND METHOD OF CLOCK RECOVERY IN A PACKET-COMPATIBLE NETWORK

CROSS-REFERENCE TO RELATED APPLICATIONS

The present application claims priority to European Patent Application No. 21195799.8 that was filed Sep. 9, 2021, the contents of which is hereby incorporated by reference in its entirety.

TECHNICAL FIELD

The presently disclosed subject matter relates to the field of data communication, and, more particularly, to distributing a clock and clock recovering in a packet-compatible network.

BACKGROUND

Proper operation of a data network (e.g. a telecommunication network) requires time and/or frequency synchronization between various entities therein. Synchronization can be achieved, for example, by exchange timing information (time-transfer) across the network. One of the protocols for exchanging timing information over a packet data network is the IEEE 1588 Precision Time Protocol (PTP) usable for frequency and phase synchronization. Another example of timing protocol is Network Time Protocol (NTP). Both protocols are in-band protocols encapsulating timestamps into data packets. While in the NTP case the network nodes receive synchronization data in a pull mode (from a server or from several peer nodes), in the PTP cases, client clock nodes (referred to hereinafter also as client clocks), receive synchronization data from a master clock node (referred to hereinafter also as a master clock) in a push mode. NTP clients or PTP client clocks nodes are referred to hereinafter also as timing-clients, and NTP server or PTP master clock node are referred to hereinafter also as timing-server.

For purpose of illustration only, and unless specifically stated otherwise, the following description is provided for PTP-based synchronization. Those skilled in the art will readily appreciate that the teachings of the presently disclosed subject matter are, likewise, applicable to other time-transfer protocols and/or procedures that are usable for the exchange of time-related information in a packet data network.

Through exchange of PTP packets, which include timestamps carried inside, PTP protocol enables synchronization between a master clock node, that has access to an accurate time source (e.g. Global Positioning System) and client clock nodes having less accurate clocks. The built-in timestamps are usable for frequency and phase recovery between the clocks.

The precision and accuracy of the synchronization algorithms (referred to hereinafter also as "clock recovery" algorithms) depend on multiple factors that can cause the clocks to drift apart or lose synchronization. Problems of improving the synchronization accuracy have been recognized in the conventional art and various techniques have been developed to provide solutions, for example:

US Patent Application No. 2019/02076951 discloses a technique of estimating the offset, skew and drift of a slave clock in a slave device compared to a master clock in a master device. The technique includes: exchanging timing messages between the master device and the slave device and recording the times of sending and receiving said messages and estimating the offset, skew and drift of the slave clock compared to the master clock from said recorded times; wherein the estimating involves using a Kalman filtering approach in which a measurement equation contains a term relating to the offset of the slave clock at the time of measurement and a process equation contains terms relating to the offset, skew and drift of the slave clock at both the current time and the time of the previous measurement.

US Patent Application No. 2018/01458631 discloses a technique of estimating the phase offset between a master clock in a server and a slave clock in a client. The technique includes: within a time window of predetermined duration, exchanging timing messages between the server and the client and recording timestamps which are the times of sending and of receipt of those messages according to the master and slave clocks; determining, from those timestamps, at least one first timestamp pair, which is the times of sending and receipt associated with the least delayed timing message sent from the server to the client in the window; determining, from those timestamps, at least one second timestamp pair, which is the times of sending and receipt associated with the least delayed timing messages sent from the client to the server in the window; generating, from the first and second timestamp pairs at least one composite timing message, which includes said first timestamp pair and said second timestamp pair; using said composite timing messages to estimate the phase offset between the master clock and the slave clock.

US Patent Application No. 2015/0163154 discloses a technique of selecting packets transmitted from a first device to a second device over a packet network. The technique includes: sending, from the first device to the second device, packets; recording the time of receipt of said packets according to a clock in the second device; repeatedly, for each of a plurality of groups of said packets: determining an optimal inter-arrival time between successive packets at the second device; calculating, for each packet in said group, the inter-arrival time between the packet and the preceding packet; selecting the packet in said group which has an inter-arrival time which is the closest to the optimal inter-arrival time.

US Patent Application No. 2013/0208735 discloses, in a network device communicatively coupled to a master clock via a plurality of different communication paths, a clock synchronization module configured to determine a plurality of path time data sets corresponding to the plurality of different communication paths based on signals received from the master clock via the plurality of different communication paths between the network device and the master clock. A clock module is configured to determine a time of day as a function of the plurality of path time data sets.

US Patent Application No. 2012/0269204 discloses a technique of increasing accuracy of timing over packet networks by generating correction factors from multiple separation intervals and timing information contained in packets in both directions between a master and a slave. The technique is based on evaluating the weighted average of short-term, medium-term, and long-term measurements of local clock offset. Weighted averages are used to develop robust correction terms that are modified with an and alpha-shaping factor to provide additional immunity to packet network instabilities.

US Patent Application No. 2009/0276542 discloses a timing system for time synchronization between a time server and a time client over a packet network. The timing system includes a time server for generating current timestamp information and a time client having a phase-locked loop driven client clock counter. The time client periodically exchanges time transfer protocol messages with the time server over the packet network, and calculates an estimated client time based on the timestamp information. The phase-locked loop in the time client receives periodic signals representing the estimated server time as its input and calculates a signal which represents the error difference between the estimated server time and the time indicated by the time client clock counter. The error difference eventually converges to zero or a given error range indicating the time presented by the client clock counter, which is driven by the phase-locked loop having locked onto the time of the time server.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

In accordance with certain aspects of the presently disclosed subject matter, there is provided a method of clock recovery in a packet-compatible network implementing a time-transfer protocol, the network comprising at least one client clock node operatively connected to a master clock node. The method comprises: a) by the master clock node or by the client clock node, generating a first flow of time-stamped packets bearing indication of high priority of delivery and, in parallel, generating a second flow of time-stamped packets bearing indication of lower priority of delivery; b) by the client clock node, processing the packets from the first flow separately from the packets from the second flow to define, separately for each flow, a function informative of changes of packets' delays in the respective flow over time; c) by the client clock node, using the defined functions informative of changes of packets' delays in the first and the second flows over the same time intervals to assess a cause of the packets' delays changes; and d) by the client clock node, applying a clock recovery algorithm in a manner differentiated in accordance with the assessed cause.

By way of non-limiting example, the assessed cause of the packets' delays changes can be a network delay change, a network topology change and/or a local oscillator drift.

The function defined for a respective flow can be informative of changes of Delay Floor, the Delay Floor being indicative of the minimum delay that a packet can experience in the respective flow during a predefined collection period.

In accordance with further aspects of the presently disclosed subject matter, the packets in the first flow can be "SYNC" PTP messages generated by the master clock node and usable, inter alia, for clock recovery in accordance with PTP protocol. Alternatively, the first flow can be generated by the master clock node in addition and in-parallel to PTP messages usable for PTP-based clock recovery and can comprise time-stamped packets with equal size. The packets in the second flow can be "SYNC" PTP messages generated by the master clock node, but not usable by PTP protocol for clock recovery as bearing indication of lower priority. Alternatively, the second flow can be generated by the master clock node to comprise other time-stamped packets with equal size.

In accordance with further aspects of the presently disclosed subject matter, the packets in the first flow can be "DELAY REQUEST" PTP messages generated by the client clock node and usable, inter alia, for clock recovery in accordance with PTP protocol. Alternatively, the first flow can be generated by the client clock node in addition and in-parallel to PTP messages usable for PTP-based clock recovery and can comprise time-stamped packets with equal size. The packets in the second flow can be "DELAY REQUEST" PTP messages generated by the client clock node, but not usable by PTP protocol for clock recovery as bearing indication of lower priority. Alternatively, the second flow can be generated by the client clock node to comprise other time-stamped packets with equal size.

In accordance with further aspects and, optionally, in combination with other aspects of the presently disclosed subject matter, operations a)-c) above can be provided in a continuous manner, while the clock recovery algorithm can be applied in a differentiated manner when the changes in the packets' delays exceed a predefined threshold. Alternatively, the method can comprise continuous monitoring by the client clock node the changes in the packets' delays, and initiating operations a)—d) when the changes exceed a predefined threshold.

In accordance with further aspects and, optionally, in combination with other aspects of the presently disclosed subject matter, the processing the packets received in the first and in the second flows can comprise:
  using the timestamps of the received packets to calculate the delays thereof and defining, separately for each flow, Delay Floors for each of a plurality of collection windows same for both flows;
  using, same for both flows, a plurality of short observation windows constituting a long observation window to calculate, separately for each flow, the maximal change of the defined Delay Floors; and
  using the calculated maximal changes to assess the cause of Delay Floors changes, wherein the assessment is provided in accordance with one or more predefined evaluation thresholds related to one or more differences between the functions defined for the high and the low priority flows.

In accordance with further aspects and, optionally, in combination with other aspects of the presently disclosed subject matter, the method can further comprise:
  responsive to the assessment of the cause as local oscillator drift changes, applying the clock recovery algorithm to compensate the drift;
  responsive to the assessment of the cause as a network delay change, applying the clock recovery algorithm to increase a size of buffer collecting PTP messages usable for the PTP protocol and, thereby, decrease the sensitivity to the delay change; and
  responsive to the assessment of the cause as a network topology change, applying the clock recovery algorithm to move to holdover and to re-sync.

In accordance with other aspects of the presently disclosed subject matter, there is provided a client clock node configured to operate in a packet-compatible network comprising a master clock node operatively connected to the client clock node, wherein the client clock node is further configured to operate in accordance with the method detailed above.

In accordance with other aspects of the presently disclosed subject matter, there is provided a master clock node configured to operate in a packet-compatible network comprising a plurality of client clock nodes operatively connected to the master clock node, wherein the master clock node is further configured to operate in accordance with the method detailed above.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "calculating", "assessing", "generating", "using" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the controller, the clock agent and respective parts thereof disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1A:
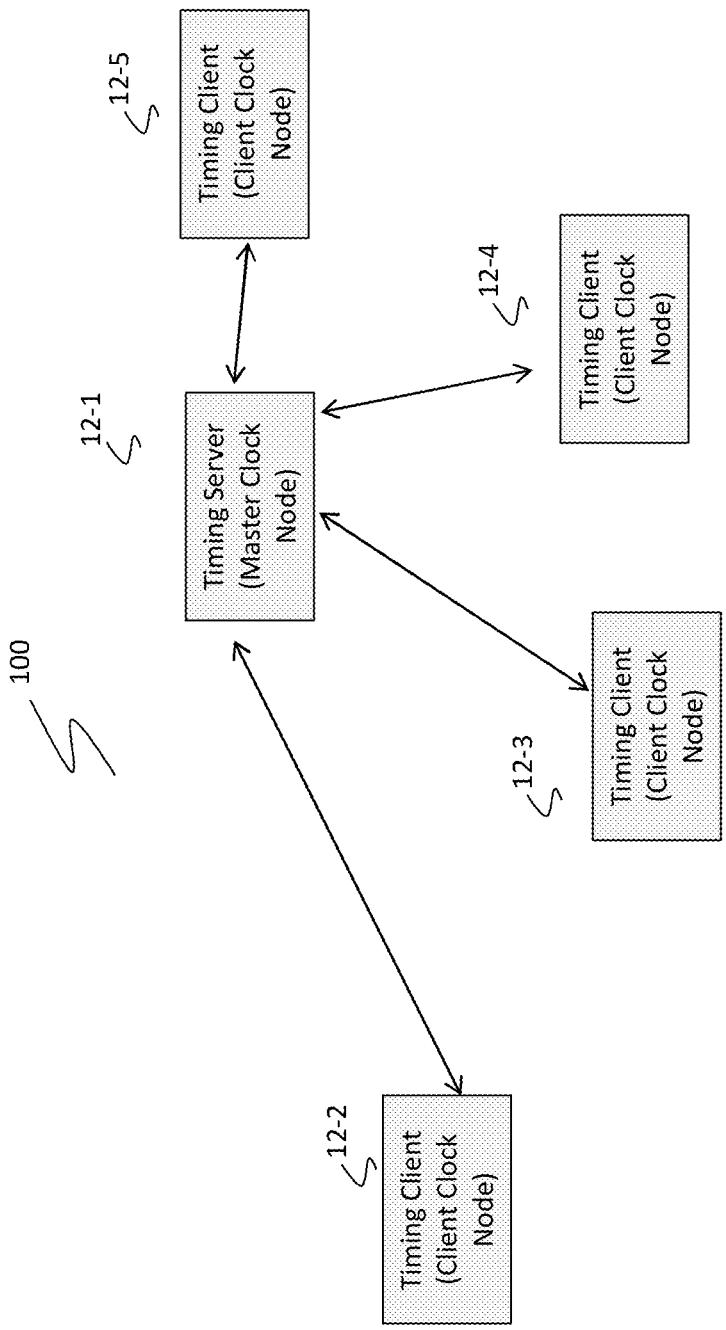
FIG. 1a illustrates a generalized schematic architecture of an exemplary time distribution network implementing the Precision Time Protocol (PTP) as known in prior art.

Bearing this in mind, attention is drawn to FIG. 1a schematically illustrating an exemplary time distribution network 100 including a plurality of clock nodes denoted as 12-1-12-5 and implementing the Precision Time Protocol (PTP) as known in prior art. Each clock node comprises a processing and memory circuitry and a clock circuitry. In accordance with IEEE 1588 standards, clock distribution in the network 100 is implemented in a hierarchical manner.

Clock nodes 12-2-12-5 are operatively connected to the clock node 12-1 via respective clock ports (not shown). Clock node 12-1 is configured to be the source of synchronization data, i.e. to serve as PTP master clock node (timing-server) and to provide the timing reference to the client clock nodes 12-2-12-5 (timing-clients).

The exemplary PTP-based time distribution network 100 operates on top of a packet-compatible communication network (not shown) which comprises a plurality of network nodes organized in ring, bus, tree, star, or mesh topologies, or a combination of different topologies. Clock nodes correspond to hosting network nodes of the underlying communication network and can constitute parts of the respective network nodes.

Figure 1B:
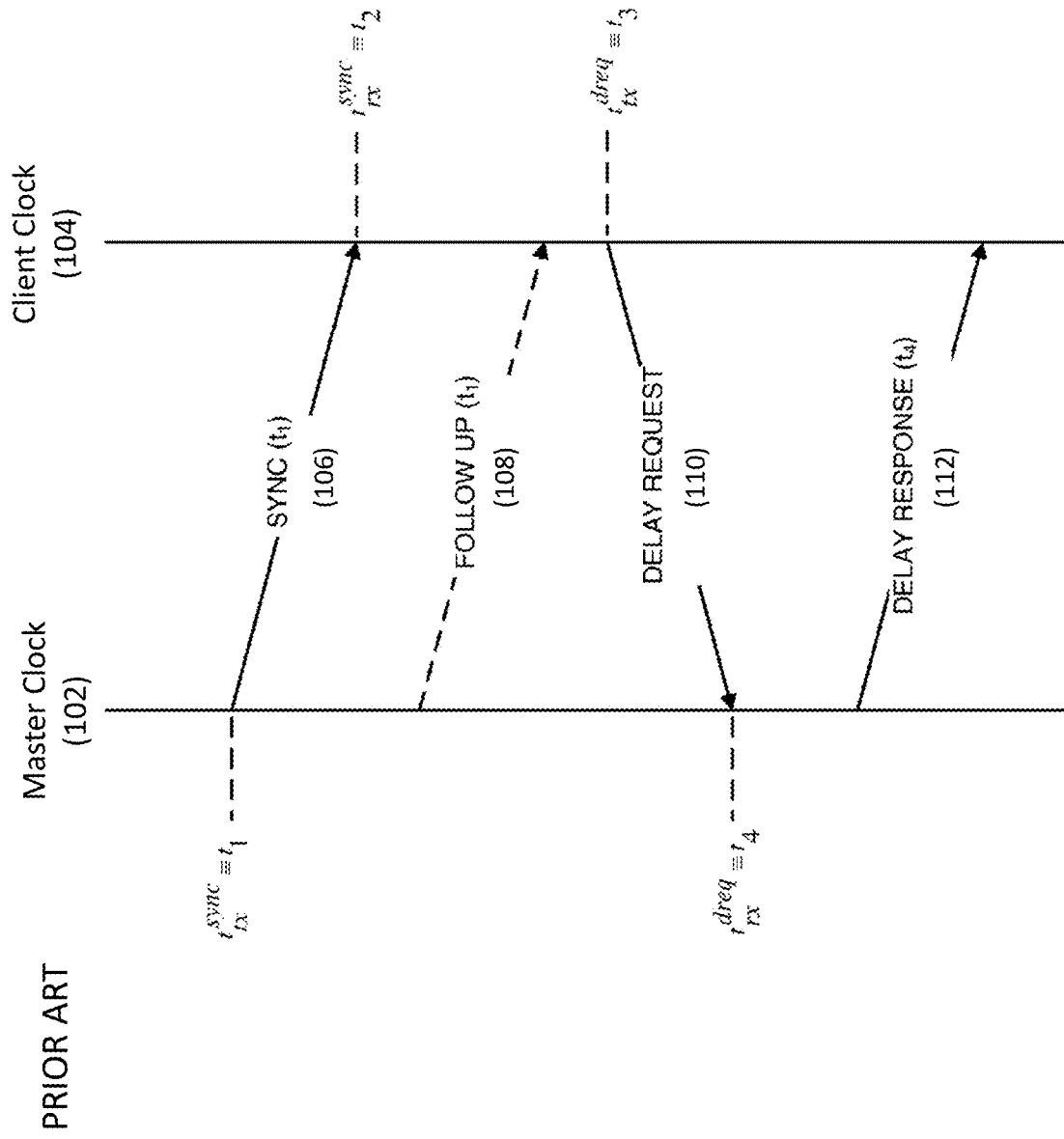
FIG. 1b illustrates a clock synchronization procedure in accordance with the PTP protocol as known in prior art.

Referring to FIG. 1b, there is illustrated a simplified sequence of message exchange between the master clock node 12-1 and one of client nodes when operating the PTP protocol as known in prior art. FIG. 1b provides a pictorial representation of SYNC, SYNC FOLLOW UP, DELAY RESPONSE, and DELAY REQUEST PTP messages and the associated timing information that are exchanged between a master clock 102 and a client clock 104.

Each PTP message comprises a header and a body. The header comprises Message_Type field that enables recognizing a respective message as a PTP message and defines the type of PTP messages (e.g. SYNC, DELAY REQUEST, DELAY RESPONSE, etc.).

SYNC message 106 comprises embedded by the master clock timestamp, $t_{tx}^{sync}$ (referred to hereinafter also as $t_1$), which represents the time at which the transmission of the SYNC message 106 was initiated. The SYNC message 106 is received at a certain time, $t_{rx}^{sync}$ (referred to hereinafter also as $t_2$), by the receiving client clock 104. Since $t_2$ is measured by the client clock, the value of $t_2$ can be less accurate than $t_1$ measured by the master clock. Equation (1) expresses the relationship between the time values $t_1$ (timestamp "as sent") and $t_2$ (timestamp "as received") in terms of the network transit delay ($\Delta t_{delay}^{sync}$) and the time offset ($\Delta t_{offset}$) between the client clock measurement and the master clock measurement: $t_2 = t_1 + \Delta t_{delay}^{sync} + \Delta t_{offset} = t_1 + \Delta t^{sync}$ (1).

Optionally (e.g. when the master clock hardware does not support inclusion of timestamp $t_1$ in the SYNC message 106), a highly accurate hardware measurement of the timestamp, $t_1$, can be transferred not within the sync packet itself, but within a separate SYNC FOLLOW UP message 108.

The client clock sends to the master clock DELAY REQUEST message 110 informative of measured by the client clock transmission time $t_{tx}^{dreq}$ (referred to hereinafter also as $t_3$). The master clock notes the reception time, $t_{rx}^{dreq}$ (referred to hereinafter also as $t_4$) of the DELAY REQUEST message 110; it generates, in response, DELAY RESPONSE message 112 and transmits the DELAY RESPONSE message 112 to the client clock. The DELAY RESPONSE message 112 provides the timing information $t_4$ back to the client clock. Similar to Equation (1), the relationship between time values $t_3$ and $t_4$ can be expressed as: $t_4=t_3+\Delta t_{delay}^{dreq}+\Delta t_{offset}=t_3+\Delta t^{dreq}$ (2). Equations (1) and (2) can produce the client clock offset $\Delta t_{offset}$ indicative of time difference between the client clock and the master clock.

The values of $t_1$, $t_4$ (collectively referred to also as master timestamps) transmitted to the client clock 104 as part of message exchange and values $t_2$ and $t_3$ (collectively referred to also as client timestamps) generated by the client clock 104 are stored in a memory location accessible by the client clock 104. The client clock further uses the collected timestamps and generates clock-recovery data usable for clock (i.e. frequency and/or phase) recovery.

It is noted that in addition to exchange of synchronizing messages detailed above with reference to FIG. 1B, PTP supports other synchronizing messages (e.g. for peer-to-peer synchronization). PTP also supports other announce and signaling messages usable to configure and maintain the PTP-based clock distribution.

Figure 2:
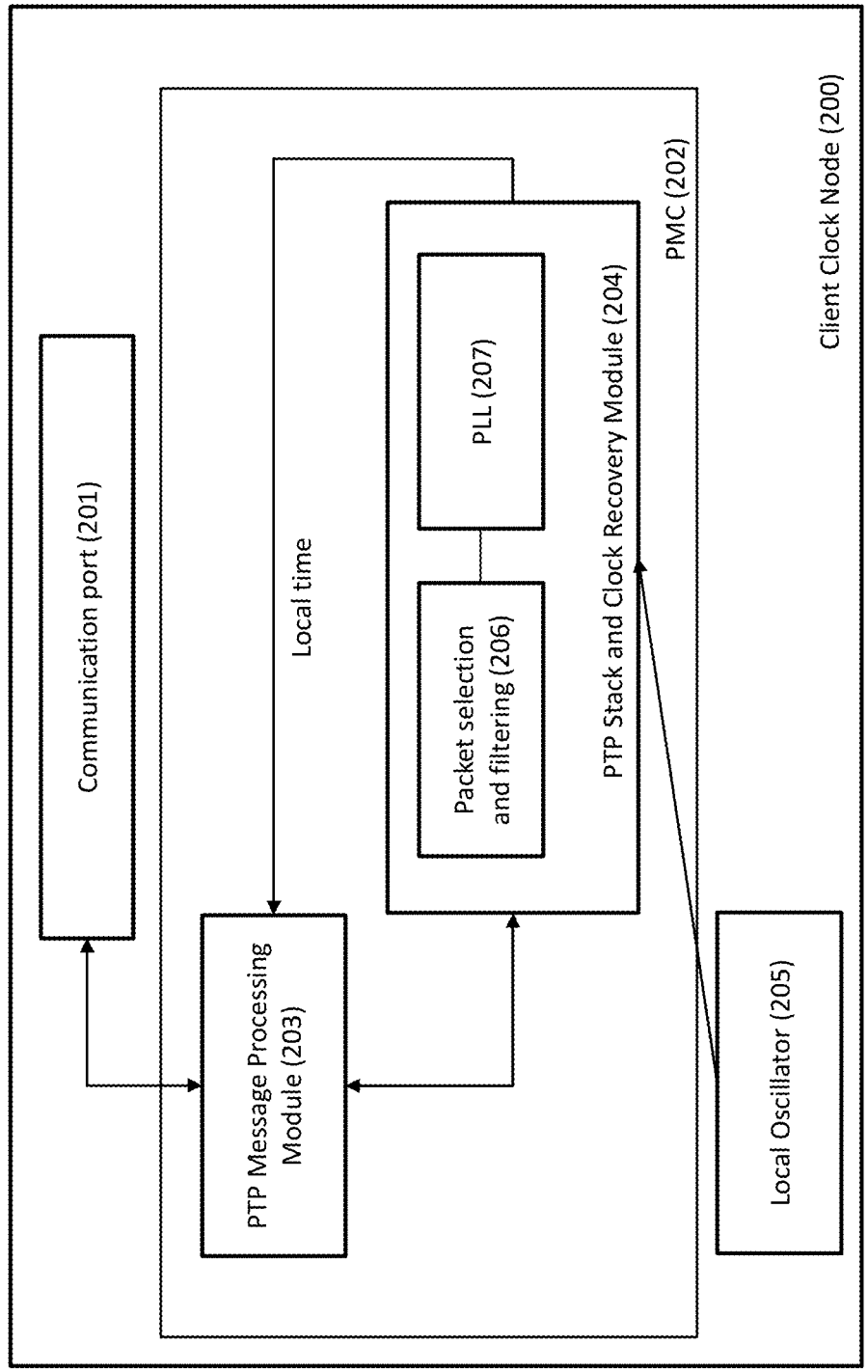
FIG. 2 illustrates a generalized block diagram of a client clock node as known in the art.

Referring to FIG. 2, there is illustrated a generalized block diagram of a client clock node 200 as known in the art. Client clock node 200 comprises a processing and memory circuitry (PMC) 202 operatively connected to a communication port 201 and to a local oscillator 205.

Communication port 201 is configured to enable the client clock node to exchange time-informative data packets with the master clock node.

PMC 202 is configured to execute several functional modules in accordance with computer-readable instructions implemented therein on a non-transitory computer-readable storage medium. Such functional modules are referred to hereinafter as comprised in the PMC. The functional modules can be implemented in any appropriate combination of software with firmware and/or hardware.

PMC 202 comprises a PTP messages processing functional module 203 operatively connected to a PTP stack & clock recovery functional module 204. PTP messages processing module 203 is configured to extract and time-stamp PTP messages for the node's egress direction and encapsulate and time-stamp messages from PTP stack for the node's ingress direction. PTP stack & clock recovery module 204 is configured to generate PTP messages and to run a clock recovery algorithm.

Clock recovery module 204 further comprises a packet selecting and filtering (PSF) block 206 and a phase-locked loop (PLL) block 207.

PSF block 206 is configured to select, among the PTP messages received during a collection period, a set of PTP messages to be used for clock recovery.

PLL block 207 is configured to use the selected set of PTP messages by a servo control function that disciplines the local clock to bring its output (frequency and/or time) into alignment with the master's. Collection period can include one or more collection windows with pre-configured duration.

As known, when traversing a packet-compatible network, packeted PTP messages experience a variable packet delay that need to be mitigated for the accurate clock recovery. The mitigation can be enabled by selecting a sufficient set of minimally delayed PTP messages, referred to hereinafter also as "lucky" packets. Packets' delays in a given path can be characterized by a probability distribution function with a floor indicative of the minimum delay that a packet can experience in the given path. Thus, to mitigate the delay variations, PSF block 206 is configured to estimate the floor of delay distribution (referred to hereinafter also as estimated Delay Floor or Delay Floor) and select, accordingly, a buffer size in order to collect sufficient number of "lucky" packets to be used for clock recovery.

It is noted that the estimated value of Delay Floor can vary due to the changes in network traversing conditions (e.g. network load, status of queues at network nodes, etc.) and/or changes in network topology. Further, the estimated value of Delay Floor can be affected by a drift of the local oscillator (e.g. caused by oscillator's aging and/or environmental changes) during Delay Floor assessment. Changes in Delay Floor can affect the duration of the collection period required for collecting the sufficient number of "lucky" packets and, thereby, can affect accuracy of the clock recovery process.

The inventors have recognized and appreciated that the accuracy of synchronization can be improved by recognizing the cause of Delay Floor changes and applying a clock recovery algorithm in a manner differentiated in accordance with the recognized cause. In accordance with certain embodiments of the presently disclosed subject matter and as will be further detailed with reference to FIGS. 3-6, the client clock node can be configured to provide clock recovery in a manner differentiated for the cases of the detected Delay Floor change caused by network delay change, caused by network topology change or caused by local oscillator drift.

Figure 3:
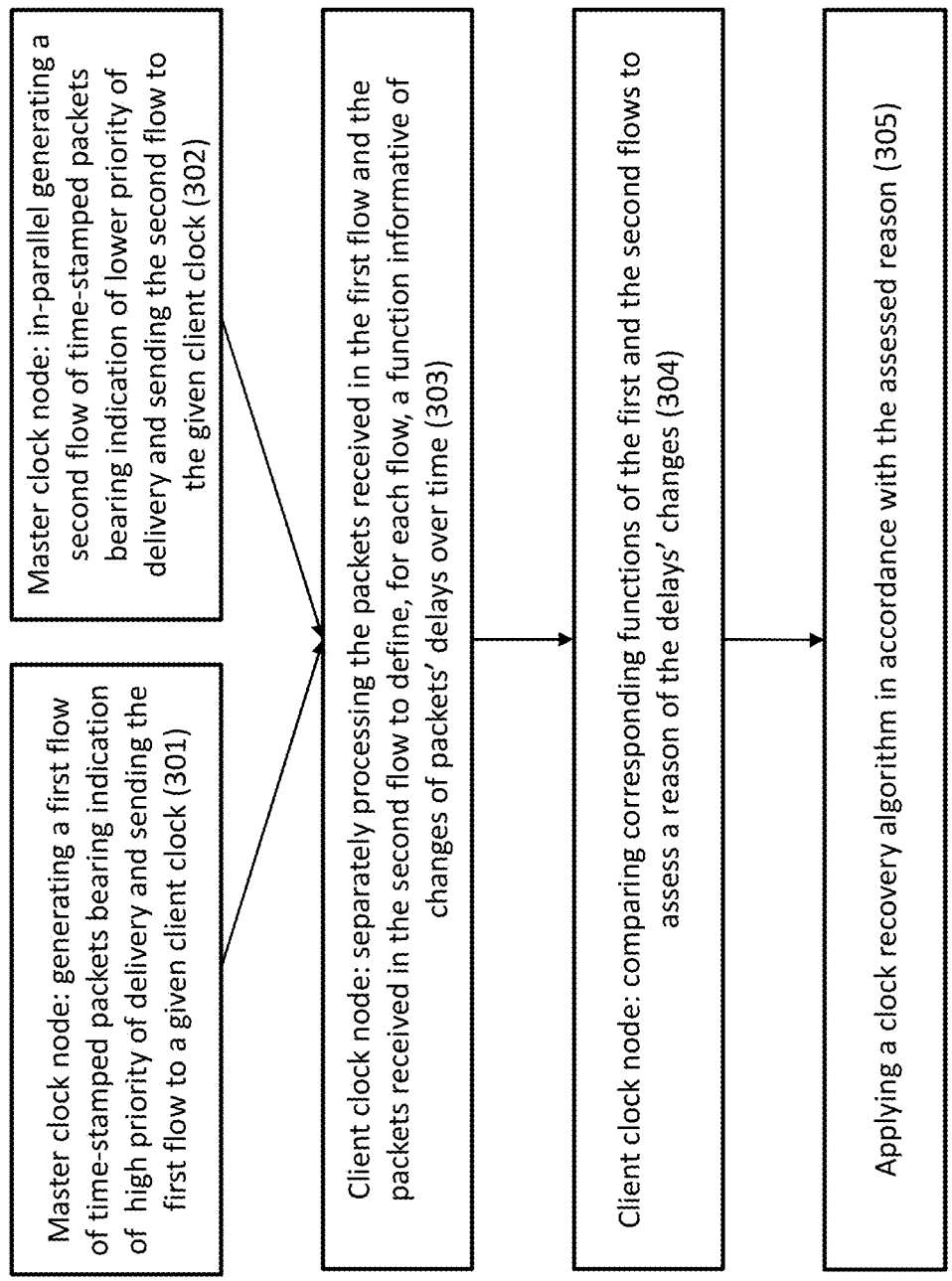
FIG. 3 illustrates a generalized flow chart of clock recovery process in accordance with certain embodiments of the presently disclosed subject matter.

Referring to FIG. 3, the is illustrated a generalized flow chart of clock recovery process in accordance with certain embodiments of the presently disclosed subject matter. Master clock node generates (301) a first flow of time-stamped packets bearing indication of high priority of delivery and sends the first flow to a given client clock. In-parallel, the master clock node generates (302) a second flow of time-stamped packets bearing indication of lower priority of delivery and sends the second flow to the given client clock.

Priority indication of a packet can be provided with the help of DSCP (Differentiated Services Code Point) value in a respective packet header. By way of non-limiting example, for the packets in the first flow, DSCP value can be indicative of the highest priority of delivery, and for the packets in the second flow DSCP value can be indicative of best-efforts delivery. Alternatively or additionally, the priority indication can be provided in VLAN Tags.

It is noted that in certain embodiments of the invention the clock nodes can be configured so that only PTP messages matching certain criteria are usable by PTP protocol for clock recovery. The PTP messages that do not match the certain criteria are referred to hereinafter as PTP messages that are not usable for clock recovery by PTP protocol. By way of non-limiting example, PTP messages bearing indication of the highest priority can be defined as usable, and PTP messages bearing indication of lower priority can be defined as not usable by PTP protocol for clock recovery.

In certain embodiments, the packets in the first flow can be "SYNC" PTP messages generated by the master clock node and usable, inter alia, for clock recovery in accordance with PTP protocol.

Alternatively, the first flow can be generated in addition (and in-parallel) to PTP messages usable for PTP-based clock recovery and can comprise time-stamped packets with equal size (optionally, with the size of PTP messages) bearing no indication of PTP message (and/or type thereof) in the packets' headers.

Packets in the second flow are not usable by PTP protocol for clock recovery. By way of non-limiting example, these packets can be generated as time-stamped packets with the equal size (e.g. size of PTP messages) bearing no indication of PTP message (and/or type thereof) in the packets' headers.

By way of another non-limiting example, the packets in the second flow can be generated as "SYNC" PTP messages bearing indication of low priority and thus defined as not usable for clock recovery.

As will be further detailed with reference to FIGS. 4-5, the client clock node processes (303) the packets from the first flow separately from the packets from the second flow to separately define, for each flow, a function informative of changes of packets' delays over time. The client clock node further uses the defined functions informative of changes of packets' delays in the first and the second flows over the same time intervals to assess (304) a cause of the changes. By way of non-limiting example, the function can be informative of the changes of the minimal delays, i.e. changes of Delay Floor (such function is referred to hereinafter as a "delay slope") and be defined as $(d_2-d_1)/t_w$, where $d_1$ is a value of a delay floor at the start and $d_2$ is a value of a delay floor at the end of an observation window with duration $t_w$.

After the cause has been assessed, the client clock node applies (305) a clock recovery algorithm in a manner differentiated in accordance with the assessed cause.

In certain embodiments, the master clock node and the client clock node can be configured to provide the described above assessment in a continuous manner, whilst to apply the differentiated clock recovery algorithm only when the changes in the Delay Floor exceed a predefined threshold. When Delay Floor changes are less that the predefined threshold, the clock recovery algorithm can operate in a manner known in the art with no differentiation per the cause of changes. By way of non-limiting example, such threshold can be a function of a phase accuracy target.

Alternatively, the client clock node can be configured to continuously monitor the changes in the Delay Floor, and initiate, therein and at the master clock node, assessment process and respective differentiated clock recovery when the changes exceed the predefined threshold.

Optionally, the method can further comprise generating by the client clock node a third flow with high priority packets and, in-parallel, a fourth flow with low priority packets.

The packets in the third flow can be "DELAY REQUEST" PTP messages generated by the client clock node and usable, inter alia, for clock recovery in accordance with PTP protocol. Alternatively, the third flow can be generated in addition (and in-parallel) to PTP messages usable for PTP-based clock recovery and can comprise time-stamped packets with equal size (optionally, with the size of PTP messages).

Packets in the fourth flow are not usable by PTP protocol for clock recovery. They can be generated, for example, as "DELAY REQUEST" PTP messages bearing indication of low priority (and thus defined as not usable by PTP protocol for clock recovery) or as other time-stamped packets with the size of PTP messages.

Priority indication of the packets in the third and the fourth flows can be provided with the help of DSCP or VLAN Tag in respective packet headers.

It is noted that the teachings of the presently disclosed subject matter are not bound by the flow chart illustrated in FIG. 3. For example, operations 301 and 302 can be provided by the client clock node. In such a case, the third flow (e.g. flow of "DELAY REQUEST" PTP messages) can be used as the first flow and the fourth flow can be used as the second flow.

Figure 4:
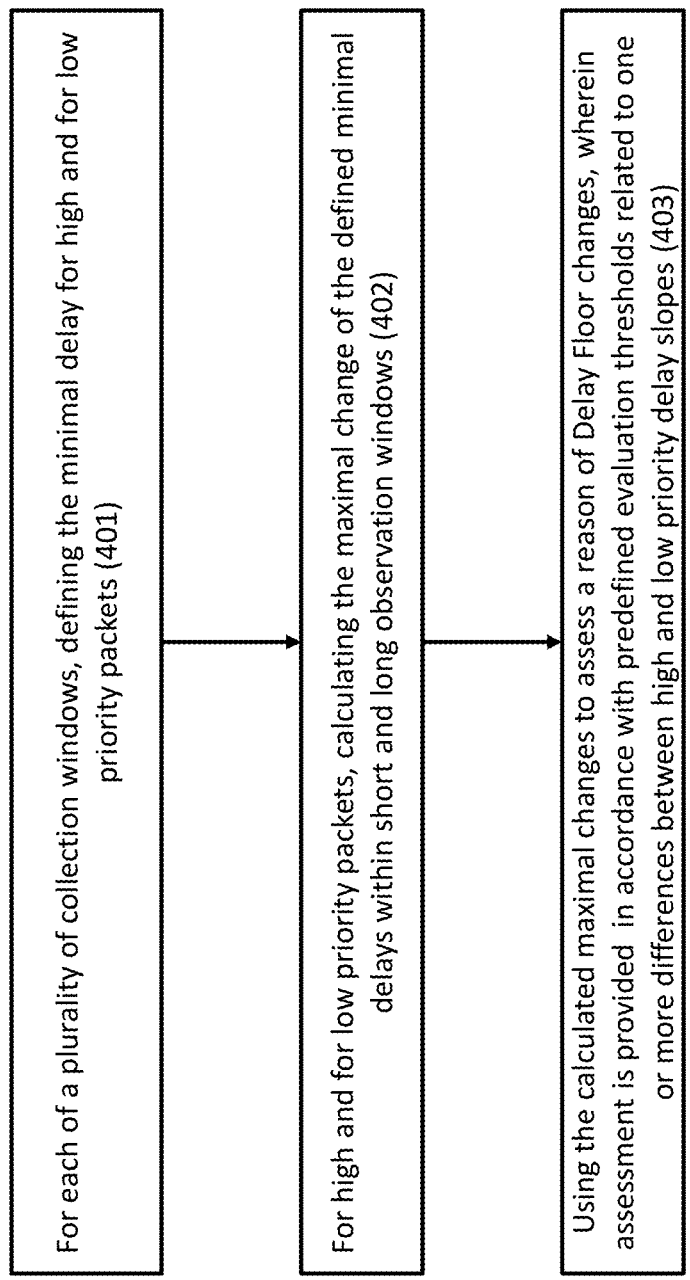
FIG. 4 illustrates a generalized flow chart of processing the packets received in the high priority and in the low priority flows to in accordance with certain embodiments of the presently disclosed subject matter.

FIG. 4 illustrates a generalized flow chart of processing the packets received in the first (high priority) and in the second (low priority) flows. Client clock node uses the timestamps (e.g. $t_1$ and $t_2$) of the received packets to calculate the packets' delays and further defines (401), separately for each of the flows, the Delay Floor within each of a plurality of collection windows. Further, separately for high and for low priority flows, client clock node uses a plurality of consecutive short observation windows constituting a long observation window to calculate (402) the maximal changes of the defined Delay Floors therein. Client clock node uses the calculated maximal changes to assess (403) a cause of Delay Floor changes, wherein the assessment is provided in accordance with predefined thresholds related to one or more differences between high and low priority delay slopes.

It is noted that the addition of processing the packets received from the third and the fourth flows (i.e. from the reversed direction) can increase the assessment confidence, especially for revealing the local oscillator drift and changes in the network topology that are expected to have the same impact in both directions.

It is further noted that the assessment's confidence can be increased by considering, in addition to the above, the differences in packet loss changes for the high priority and for the low priority packets. By way of non-limiting example, packet loss can be defined using the sequence numbers comprised in the headers of the packets. Substantial difference in the packet loss changes between the high and the low priority packets can serve as an additional witness that changes in the Delay Floor are caused by the changes in network traversing conditions.

Following is a non-limiting example of differentiated clock recovery algorithm based on assessing, by the client clock node, a cause of a Delay Floor change (DFC) in accordance with change rates of delays of high priority and low priority packets transferring between the same end points. The algorithm includes:

1) Configuring the sizes for the short observation windows ($\tau_s$) and the long observation window ($\tau_l$) constituted therewith. By way of non-limiting example, in a case of PTP message rate of 64 pps and OCXO oscillator, $\tau_s$ can be configured as 30 sec and $\tau_l$ can be configured as 3000 sec.

2) Configuring evaluation thresholds related to difference(s) between the high and low priority delay slopes (e.g. $threshold_{NW\ change}$, and $threshold_{jump}$ explained below). Likewise, configuring a "correction" threshold ($threshold_{DFC}$) indicative that a clock correction is required.

By way of non-limiting example, correction threshold ($threshold_{DFC}$) can be defined as 5% of a targeted accuracy, Network Conditions Change threshold ($threshold_{NW\ change}$) can be defined as 10% of the targeted accuracy and Network Topology Change threshold ($threshold_{jump}$) can be defined as 1.4*$threshold_{NW}$ change.

3) Upon collecting high and low priority delay samples, calculating maximum Delay Floor change (DFC) during at least part of the short observation windows ($DFC_{high\_max\_s}$ and $DFC_{low\_max\_s}$) and during the long observation window ($DFC_{high\_max\_l}$ and $DFC_{low\_max\_l}$). For a given flow, the maximum DFC during a given long observation window can be defined as a difference between the minimum delays in the first and the last short observation windows within the long observation window.

4) Assessing a cause of Delay Floor change in accordance with the above maximum DFCs and the predefined evaluation thresholds.

By way of non-limiting example, the cause of Delay Floor change can be assessed as following:
a) When, for the high priority flow, a difference between the highest and lowest short window minimums within the long window is less than threshold$_{DFC}$, the assessment conclusion is that there is no Delay Floor change that requires a correction by the differentiated clock recovery algorithm.

Figure 5A:
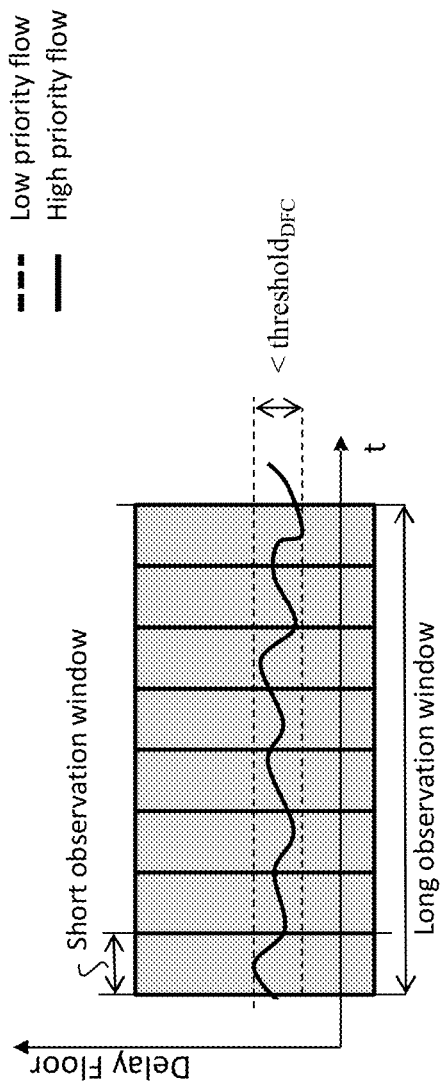
FIGS. 5a-5d illustrate generalized diagrams of assessing the causes of Delay Floor changes in accordance with certain embodiments of the presently disclosed subject matter.

The respective case is illustrated by a generalized diagram in FIG. 5a.

b) The assessment conclusion is that the cause of Delay Floor change is the changes in network topology when:
|DFC$_{low\_max\_1}$−DFC$_{high\_max\_1}$|<threshold$_{NW\_change}$
|DFC$_{high\_max\_s}$(n)−DFC$_{high\_max\_s}$(n+1)|>threshold$_{jump}$,
|DFC$_{low\_max\_s}$(n)−DFC$_{low\_max\_s}$(n+1)|>threshold$_{jump}$,
wherein maximum DFCs in the high and the low priority flows are defined for the same pair of adjusted short observation windows n and (n+1).

Figure 5B:
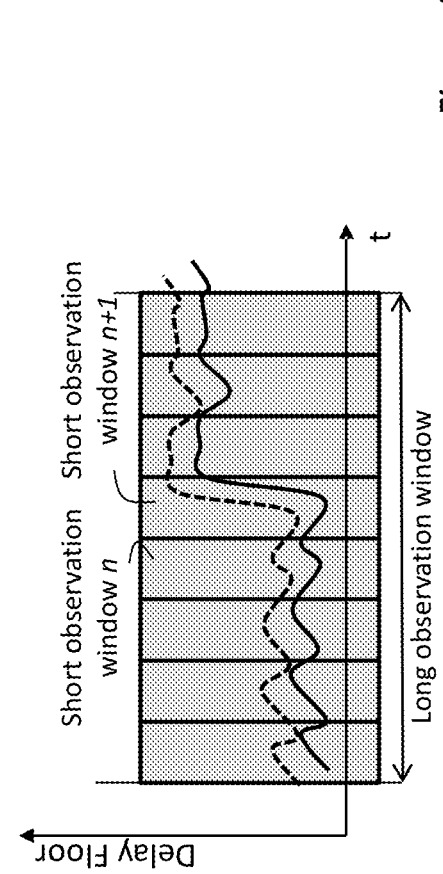

As illustrated in a generalized diagram in FIG. 5b, the packets of both priorities exhibit substantially the same change rate of the Delay Floor and the same step caused by priority-independent link delay change.

Following assessment of network topology changes, the clock recovery algorithm can move to holdover and to re-sync by re-acquiring frequency and phase signals from the master clock.

c) When, for the high priority flow, a difference between the highest and lowest short window minimums within the long window is more than threshold$_{DFC}$, and |DFC$_{low\_max\_1}$−DFC$_{high\_max\_1}$|<threshold$_{NW\ change}$, the assessment conclusion is that the cause of Delay Floor change is the local oscillator drift.

Figure 5C:
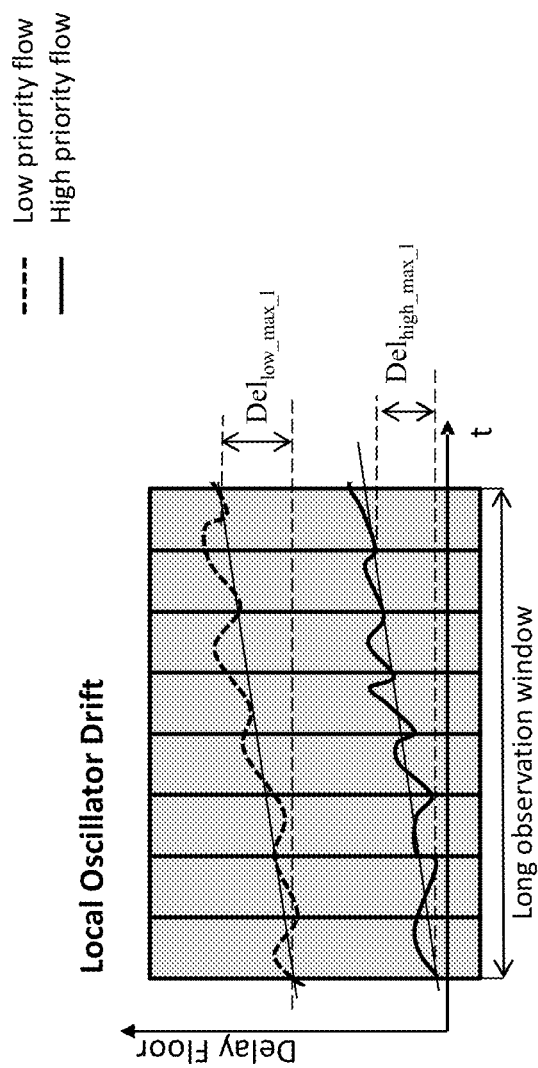

The respective case is illustrated by a generalized diagram in FIG. 5c. The Delay Floors of the low priority and the high priority packets exhibit substantially the same change rate. Following assessment of the local oscillator drift, the clock recovery algorithm can compensate the drift impact (e.g. by decreasing the collection window and increasing the frequency of compensating FFO (fractional frequency offset) changes.

The impact of differentiated applying the clock recovery algorithm to fix the revealed oscillator drift can be illustrated by the following example. Suppose that the size of collection window is 30 s and the oscillator fractional frequency offset is 1 pbb. With no capability to distinguish between the causes of the delay floor changes, the clock recovery algorithm would increase the collection period to two or more collection windows whilst increasing accumulated error by 30 ns for each additional window. Thus, applying a clock recovery algorithm in accordance with the assessed oscillator drift enables to avoid unnecessary increase of the collecting period.

d) The assessment conclusion is that the cause of Delay Floor change is the changes in network traversing conditions when, for the high priority flow, a difference between the highest and lowest short window minimums within the long window is more than threshold$_{DFC}$ and |DFC$_{low\_max\_1}$−DFC$_{high\_max\_1}$|>threshold$_{NW\_change}$.

Figure 5D:
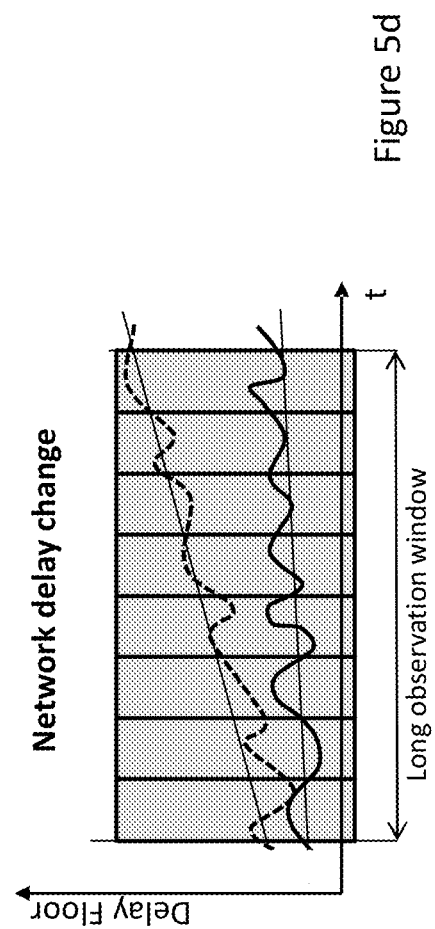

As illustrated in a generalized diagram in FIG. 5d, the packets with lower priority yield greater delay due to the network conditions. In this case, the clock recovery algorithm can increase the buffer size and, thereby, decrease the sensitivity to the delay change.

e) When no one of the above conditions a)-d) is matched, the clock recovery algorithm can be configured to first fix the local oscillator drift and then to repeat the measurement and assessment process as above.

It is noted that the teachings of the presently disclosed subject matter are not bound by the flow chart detailed with reference to FIGS. 4 and 5. The assessment can be provided using other than delay slope functions characterizing the changes of packets' delays over time (e.g. mean, median or other statistical values of delays over a time period), other thresholds and other criteria.

Figure 6:
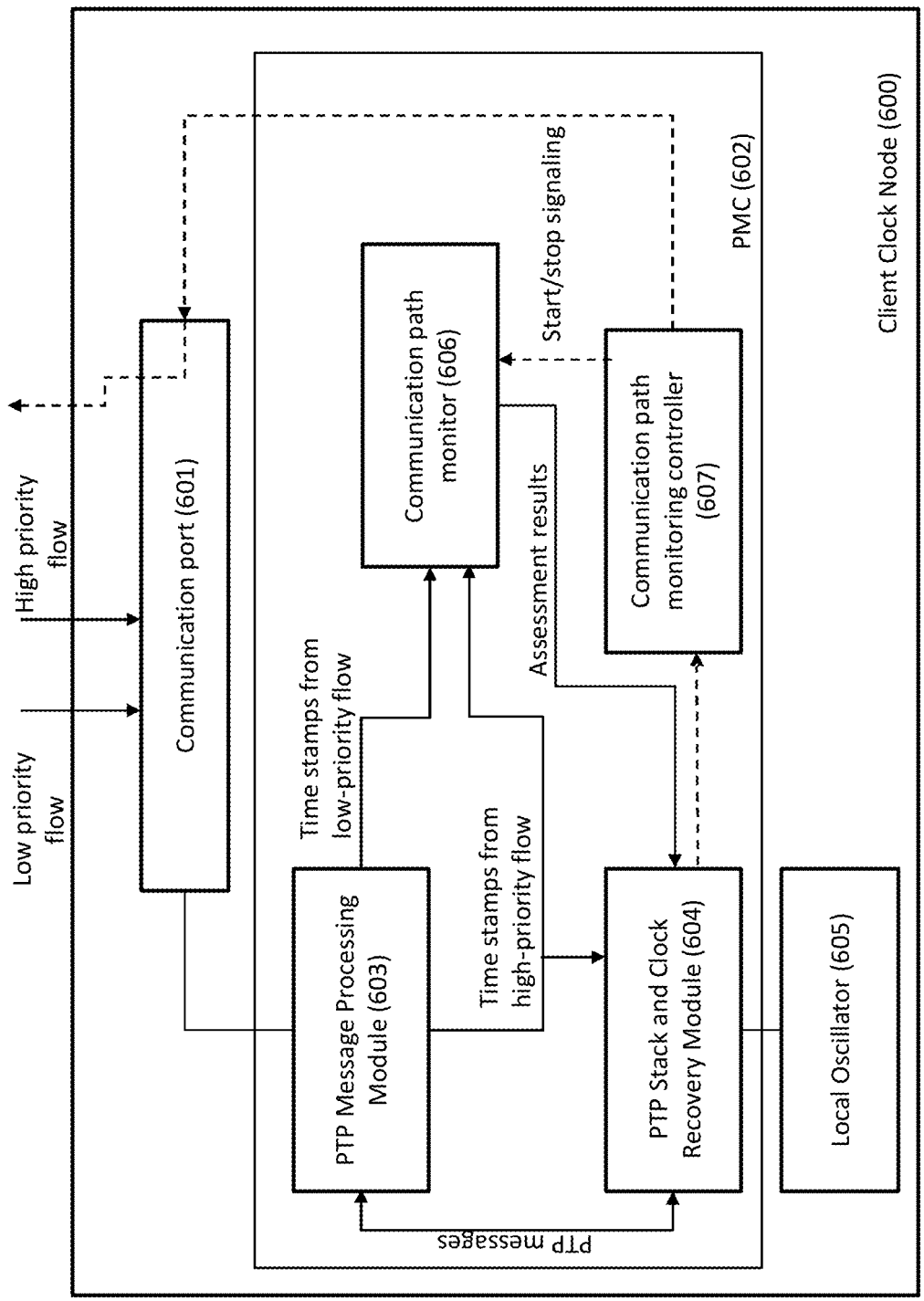
FIG. 6 illustrates a generalized block diagram of the client clock node in accordance with certain embodiments of the presently disclosed subject matter.

Referring to FIG. 6, there is illustrated a generalized block diagram of a client clock node 600 configured in accordance with certain embodiments of the currently disclosed subject matter.

Likewise, the client clock node illustrated in FIG. 2, client clock node 600 comprises a processing and memory circuitry (PMC) 602 operatively connected to a communication port 601 and to a local oscillator 605.

For the purpose of illustration only, the following description is provided for the high priority flow comprising PTP messages usable, inter alia, for PTP-based clock recovery. Those skilled in the art will readily appreciate that the teachings of the presently disclosed subject matter are, likewise, applicable to other combinations of the high and low priority flows described with reference to FIG. 3.

PMC 602 comprises operatively connected PTP messages processing functional module 603, PTP stack & clock recovery functional module 604 and communication path monitoring module 606.

Communication port 601 is configured to enable the client clock node to exchange time-informative data packets with the master clock node. Communication port 601 is further configured to the received low priority packet flow and high priority PTP messages, and to forward them to PTP messages processing module 603.

Processing module 603 is configured to extract timestamps "as sent" from the packets from the high priority flow and from the low priority flow, provide timestamps "as received" and send the extracted timestamps, in association with correspondingly provided timestamps "as received" and with indication of priority, to communication path monitor 606.

Communication path monitor 606 is configured to separately process the received associated timestamps obtained from the high priority packets and from the low priority packets. Processing can be provided in a manner detailed with reference to FIG. 4. Communication path monitor 606 is further configured to send data informative of the assessment results to clock recovery module 604.

PTP messages processing module 603 is further configured to send the timestamps "as sent" (t$_1$) extracted from the high priority PTP messages along with the correspondingly provided timestamps "as received" (t$_2$) to clock recovery module 604 for further processing.

Communication path monitor 606 and/or clock recovery module 604 can be configured to monitor the changes in the Delay Floor. Communication path monitor 606 can send the assessment results and/or clock recovery module 604 can apply respectively differentiated cloak recovery algorithm when the changes in the Delay Floor exceed a predefined threshold.

Optionally, client clock node 600 can comprise communication path monitoring controller 607 operatively connected to modules 604 and 606. Clock recovery module 604 can be configured to monitor the changes in the Delay Floor and inform controller 607 when the delay is beyond the predefined threshold. Responsive to this, controller 607 can initiate the operation of monitor 606 and send "start" signalling to the master clock node to begin in-parallel generation of the high and the low priority flows as described above. Likewise, when the monitored DFC does not require differentiated clock recovery, controller 607 can initiate pausing the operations. Start/stop signalling can be send to the master clock node using proprietary PTP signalling messages or other appropriate proprietary protocol.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of clock recovery in a packet-compatible network implementing a time-transfer protocol, the network comprising a client clock node operatively connected to a master clock node, the method comprising:
   a. by the master clock node or by the client clock node, generating a first flow of time-stamped packets bearing indication of high priority of delivery and, in parallel, generating a second flow of time-stamped packets bearing indication of lower priority of delivery;
   b. by the client clock node, processing the packets from the first flow separately from the packets from the second flow to define, separately for each flow, a function informative of changes of packets' delays in the respective flow over time;
   c. by the client clock node, using the defined functions informative of changes of packets' delays in the first and the second flows over the same time intervals to assess a cause of the packets' delays changes; and
   d. by the client clock node, applying a clock recovery algorithm in a manner differentiated in accordance with the assessed cause of the packets' delays changes, wherein:
      when the assessed cause is a local oscillator drift changes, the clock recovery algorithm is applied to compensate the drift impact,
      when the assessed cause is a network delay change, the clock recovery algorithm is applied to increase size of buffer collecting Precision Time Protocol (PTP) messages usable or the PTP protocol and, thereby, decrease the sensitivity to the delay change; and
      when the assessed cause is a network topology change, the clock recovery algorithm is applied to move to holdover and to re-sync.

2. The method of claim 1, wherein the assessed cause of the packets' delays changes is a network delay change, a network topology change or a local oscillator drift.

3. The method of claim 1, wherein the function defined for a respective flow is informative of changes of a Delay Floor, the Delay Floor being indicative of the minimum delay that a packet can experience in the respective flow during a predefined collection period.

4. The method of claim 1, wherein the packets in the first flow are "SYNC" PTP messages generated by the master clock node and bearing indication of high priority of delivery.

5. The method of claim 1, wherein the first flow is generated by the master clock node in addition and in-parallel to PTP messages usable for PTP-based clock recovery and comprises time-stamped packets with equal size.

6. The method of claim 1, wherein the packets in the second flow are "SYNC" PTP messages generated by the master clock node but not usable by PTP protocol for clock recovery as bearing indication of lower priority.

7. The method of claim 1, wherein the packets in the first flow are "DELAY REQUEST" PTP messages generated by the client clock node and bearing indication of high priority of delivery.

8. The method of claim 7, wherein the packets in the second flow are "DELAY REQUEST" PTP messages generated by the client clock node but not usable by PTP protocol for clock recovery as bearing indication of lower priority.

9. The method of claim 1, wherein the first flow is generated by the client clock node in addition and in-parallel to PTP messages usable for PTP-based clock recovery and comprises time-stamped packets with equal size.

10. The method of claim 9, wherein the packets in the second flow are "DELAY REQUEST" PTP messages generated by the client clock node but not usable by PTP protocol for clock recovery as bearing indication of lower priority.

11. The method of claim 1, wherein operations a)-c) are provided in a continuous manner, while the clock recovery algorithm is applied in a differentiated manner when the changes in the packets' delays exceed a predefined threshold.

12. The method of claim 1, further comprising continuously monitoring by the client clock node the changes in the packets' delays, and initiating operations a)-d) when the changes exceed a predefined threshold.

13. The method of claim 1, wherein the processing the packets received in the first and in the second flows comprises:
   using the timestamps of the received packets to calculate the delays thereof and defining, separately for each flow, Delay Floors for each of a plurality of collection windows same for both flows;
   using, same for both flows, a plurality of consecutive short observation windows constituting a long observation window to calculate, separately for each flow, the maximal change of the defined Delay Floors;
   using the calculated maximal changes to assess the cause of Delay Floors changes, wherein the assessment is provided in accordance with predefined evaluation thresholds related to one or more differences between the functions defined for the high and the low priority flows.

14. A client clock node configured to operate in a packet-compatible network comprising a master clock node operatively connected to the client clock node, wherein the client clock node is configured to:
- receive from the master clock node a first flow of time-stamped packets bearing indication of high priority of delivery and, in parallel, a second flow of time-stamped packets bearing indication of lower priority of delivery;
- process the packets from the first flow separately from the packets from the second flow to define, separately for each flow, a function informative of changes of packets' delays in the respective flow over time;
- use the defined functions informative of changes of packets' delays in the first and the second flows over the same time intervals to assess a cause of the packets' delays changes; and
- apply a clock recovery algorithm in a manner differentiated in accordance with the assessed cause of the packets' delays wherein:
  - when the assessed cause is a local oscillator drift changes, the clock recovery algorithm is applied to compensate the drift impact;
  - when the assessed cause is a network delay change, the clock recovery algorithm is applied to increase a size of buffer collecting Precision Time Protocol (PTP) messages usable for the PTP protocol and, thereby, decrease the sensitivity to the delay change; and
  - when the assessed cause is a network topology change, the clock recovery algorithm is applied to move to holdover and to re-sync.

15. The client node of claim 14, wherein the packets in the first flow are "SYNC" PTP messages generated by the master clock node and bearing indication of high priority of delivery.

16. The client node of claim 14, wherein the first flow is generated by the master clock node in addition and in-parallel to PTP messages usable for PTP-based clock recovery and comprises time-stamped packets with equal size.

17. The client node of claim 14, wherein the packets in the second flow are "SYNC" PTP messages generated by the master clock node but not usable by PTP protocol for clock recovery as bearing indication of lower priority.

18. A non-transitory computer-readable medium comprising instructions that, when executed by a client clock node operating in a packet-compatible network comprising a master clock node operatively connected to the client clock node, cause the client clock node to:
- receive from the master clock node a first flow of time-stamped packets bearing indication of high priority of delivery and, in parallel, a second flow of time-stamped packets bearing indication of lower priority of delivery;
- process the packets from the first flow separately from the packets from the second flow to define, separately for each flow, a function informative of changes of packets' delays in the respective flow over time;
- use the defined functions informative of changes of packets' delays in the first and the second flows over the same time intervals to assess a cause of the packets' delays changes; and
- apply a clock recovery algorithm in a manner differentiated in accordance with the assessed cause of the packets' delays changes, wherein:
  - when the assessed cause is a local oscillator drift changes, the clock recovery algorithm is applied to compensate the drift impact;
  - when the assessed cause is a network delay change, the clock recovery algorithm is applied to increase a size of buffer collecting Precision Time Protocol (PTP) messages usable for the PTP protocol and, thereby, decrease the sensitivity to the delay change; and
  - when the assessed cause is a network topology change, the clock recovery algorithm is applied to move to holdover and to re-sync.

\* \* \* \* \*